INVENTORS
NORIO TSUBOUCHI
MASAO TAKAHASHI
BY TSUNEO AKASHI

Hopgood & Calimafde
ATTORNEYS

INVENTORS
NORIO TSUBOUCHI
MASAO TAKAHASHI
BY TSUNEO AKASHI

Hopgood & Calimafde
ATTORNEYS

INVENTORS
NORIO TSUBOUCHI
MASAO TAKAHASHI
BY TSUNEO AKASHI

Hopgood & Calimafde
ATTORNEYS

INVENTORS
NORIO TSUBOUCHI
MASAO TAKAHASHI
BY TSUNEO AKASHI

Hopgood & Calimafde
ATTORNEYS

United States Patent Office 3,472,778
Patented Oct. 14, 1969

3,472,778
PIEZOELECTRIC CERAMIC
Norio Tsubouchi, Masao Takahashi, and Tsuneo Akashi, Tokyo, Japan, assignors to Nippon Electric Company, Limited, Tokyo-to, Japan, a company of Japan
Filed Oct. 17, 1967, Ser. No. 675,929
Claims priority, application Japan, Oct. 18, 1966, 41/68,515; Dec. 29, 1966, 42/975
Int. Cl. C04b 35/46
U.S. Cl. 252—62.9 5 Claims

ABSTRACT OF THE DISCLOSURE

A piezoelectric ceramic is disclosed characterized by high electromechanical coupling and mechanical quality factors obtainable by incorporating cobalt sequioxide and one member selected from the group consisting of antimony sesquioxide and tungsten trioxide into a lead zirconate-lead titanate-lead stannate solid solution.

Figures 1, 1A:
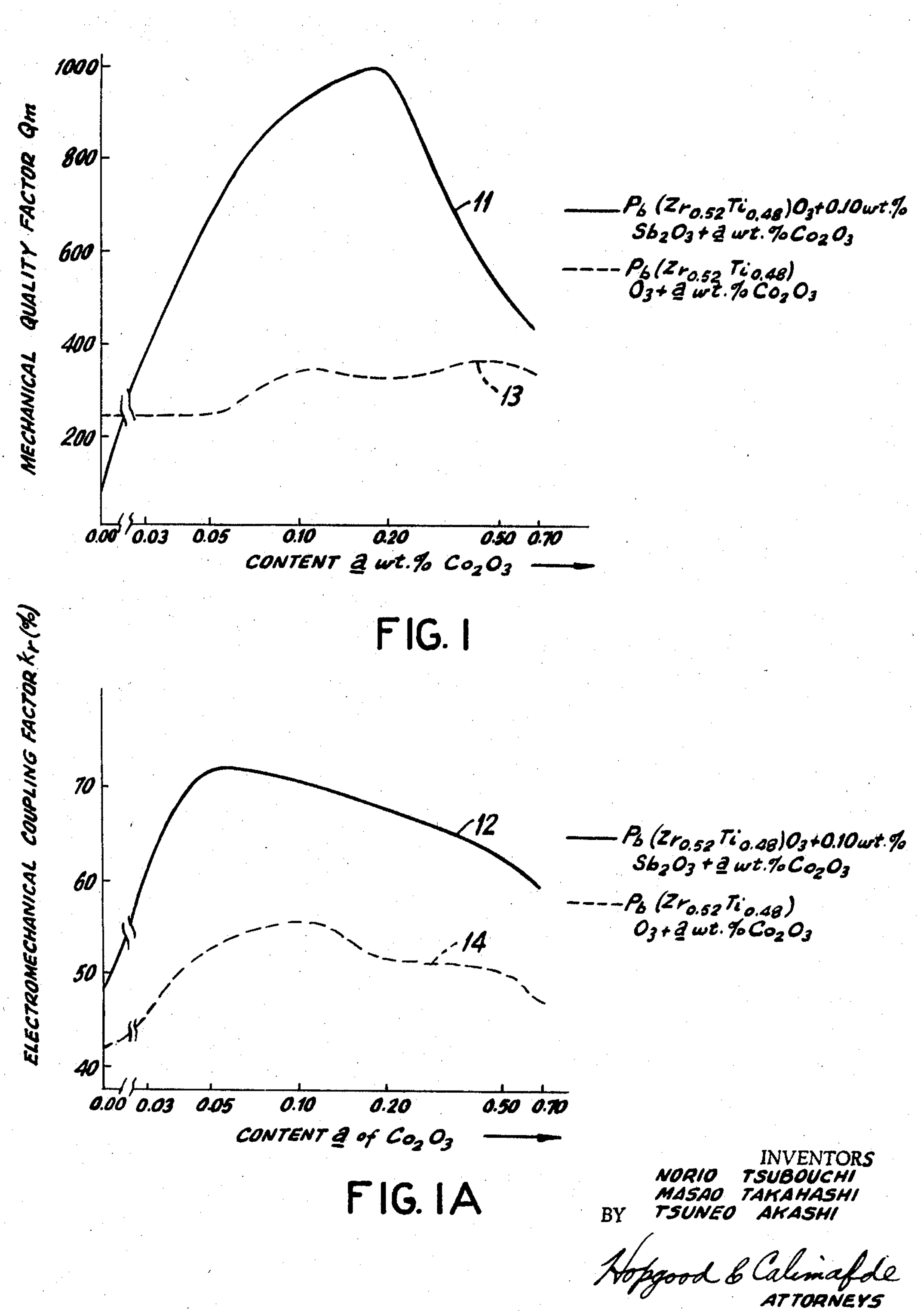

The present invention resides in a lead zirconate-lead titanate-lead stannate ceramic which contains a small amount of cobalt oxide and also a small amount of either antimony oxide or tungsten oxide.

Fundamental measures for evaluating in practice the piezoeletctric properties of a piezoelectric material are the electromechanical coupling factor and the mechanical quality factor. The former is a representative of the efficiency of transforming the electric oscillation into mechanical vibration and of conversely transforming the mechanical vibration into electric oscillation. Larger electromechanical coupling factor accounts for better transforming efficiency. The latter shows the reciprocal proportion of the energy consumed by the material during the energy conversion. Larger mechanical quality factor accounts for smaller energy consumption.

One of the typical fields of application of piezoelectric materials is manufacture of the elements of ceramic filters. In this case, it is necessary to furnish the electromechanical coupling factor with an optimum value selected from a wide range between an extremely large value and a very small value and it is also desirable for the mechanical quality factor to assume as great a value as possible. This fact is fully described, for example, in "Electronic Engineering," vol. 33 (1961), No. 3, pp. 171–177, by R. C. V. Macario, under the title of "Design Data for Band-Pass Ladder Filters Employing Ceramic Resonators."

The transducer elements of mechanical filters provide another important field of application of piezoelectric ceramics. In this case, both the electromechanical coupling factor and the mechanical quality factor should be as large as possible.

The object of this invention is to improve both electromechanical coupling factor and mechanical quality factor of a piezeoelecric material and particularly to remarkably improve the latter.

The other object of this invention is to provide materials as may be suitable to piezoelectric ceramics for the ceramic filters where large electromechanical coupling factor is required and to piezoelectric ceramics for the transducers of mechanical filters.

It has been already known that incorporation of either antimony sequioxide ($Sb_2O_3$) alone or tungsten trioxide ($WO_3$) alone into a lead zirconate-lead titanate-lead stannate solid solution has an effect in increasing the electromechanical coupling factor (U.S. Patents 3,117,094 for $Sb_2O_3$ and 3,264,217 for $WO_3$) and also that addition of cobalt sequioxide ($Co_2O_3$) alone to a lead zirconate-lead titanate-lead stannate solid solution results in increase in the electromechanical coupling factor (U.S. Patent 3,068,179).

Where either antimony sesquioxide alone or tungsten trioxide alone is added to a lead zirconate-lead titanate-lead stannate solid solution, it is noted that the mechanical quality factor markedly decreases, with the result that the materials obtained are not applicable to the elements of ceramic filters and to the transducer elements of mechanical filters. On the other hand, incorporation of cobalt sesquioxide alone into a lead zirconate-lead titanate-lead stannate solid solution results in hardly any improvement of the mechanical quality factor or at best only a slightly improved value, the resulting piezoelectric material being unsuitable for use in the elements of ceramic filters and the transducer elements of mechanical filters.

Accordingly, excellent piezoelectric materials having wide fields of application will be obtained if the electromechanical coupling factor as further enhanced and the mechanical quality factor is markedly increased as compared with those resulting from the addition of antimony oxide, tungsten oxide or cobalt oxide alone to a lead zirconate-lead titanate-lead stannate solid solution.

According to this invention, the electromechanical coupling factor and the mechanical quality factor both of exceedingly large values are obtainable by incorporating both cobalt sesquioxide and one member selected from the group consisting of antimony sesquioxide and tungsten trioxide into a lead zirconate-lead titanate-lead stannate solid solution, thereby providing materials excellent as piezoelectric ceramics for the ceramic filters where large electromechanical coupling factor is required and for the transducers of mechanical filters.

According to this invention, the basic composition is a lead zirconate-lead titanate-lead stannate solid solution. The basic composition is given as follows:

$$Pb(Zr_xTi_ySn_z)O_3$$

where the ranges for $x$, $y$ and $z$ are:

$$x=0.00\text{–}0.90$$
$$y=0.10\text{–}0.60$$
$$z=0.00\text{–}0.65$$

and where:

$$x+y+z=1.00$$

in order that the composition may have the electromechanical coupling factor serviceable in practice. As is apparent, the presence of titanate is essential with either or both of the zirconate and stannate. Compositions falling outside of the ranges do not give desirable results in that the electromechanical coupling factor is adversely affected. It is also a well-known fact that the largest electromechanical coupling factor is obtainable where $x$, $y$ and $z$ are in the general vicinity of 0.52–0.53, 0.48–0.47, and 0.00, respectively. Furthermore, it is known that the optimum piezoelectric properties are not lost even when at least one member of barium (Ba), strontium (Sr), and calcium (Ca) is substituted for up to 25 atom percent of the lead (Pb) contained in the basic composition. These known facts are described in more detail in, for example, "Journal of Research of the National Bureau of Standards," vol. 55 (1955), pp. 239–254, by B. Jaffe, R. S. Roth, and S. Marzullo, and the United States Patents Nos. 2,906,710 and 3,068,177.

Summarizing, the compositions of this invention comprise the basic composition of $Pb(Zr_xTi_ySn_z)O_3$ where $x$, $y$, $z$, and $X+y+z$ are 0.00–0.90, 0.10–0.60, 0.00–0.65, and 1.00, respectively and where at least one member of Ba, Sr, and Ca may be substituted for up to 25 atom percent of Pb contained in the basic composition.

Figure 2:
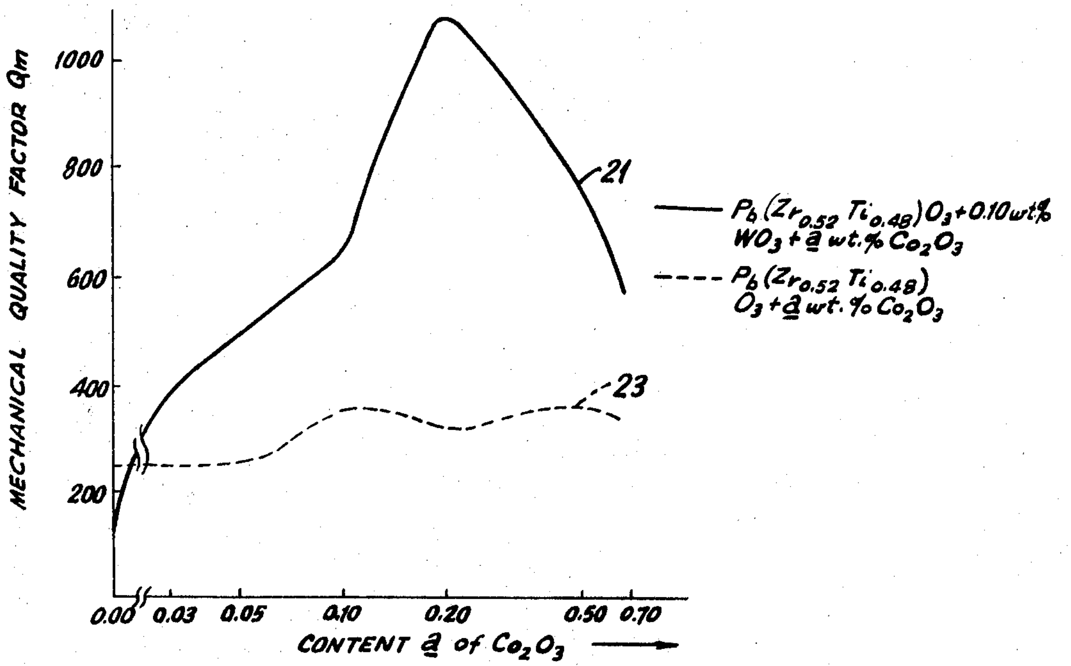
Figure 2A:
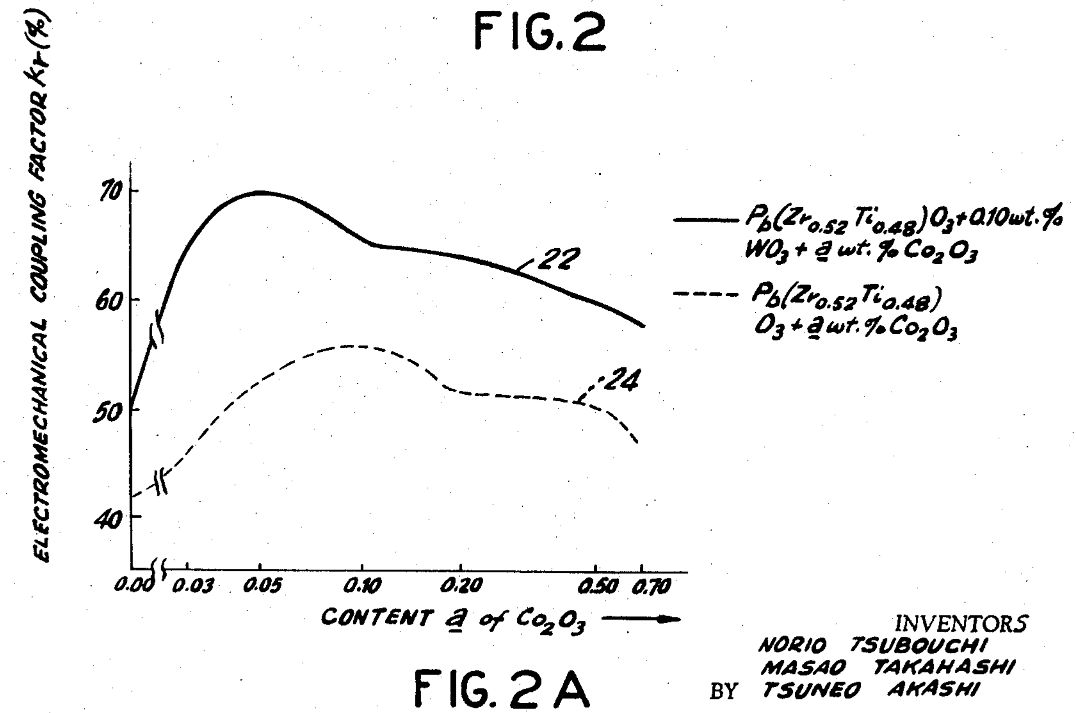
Figure 3:
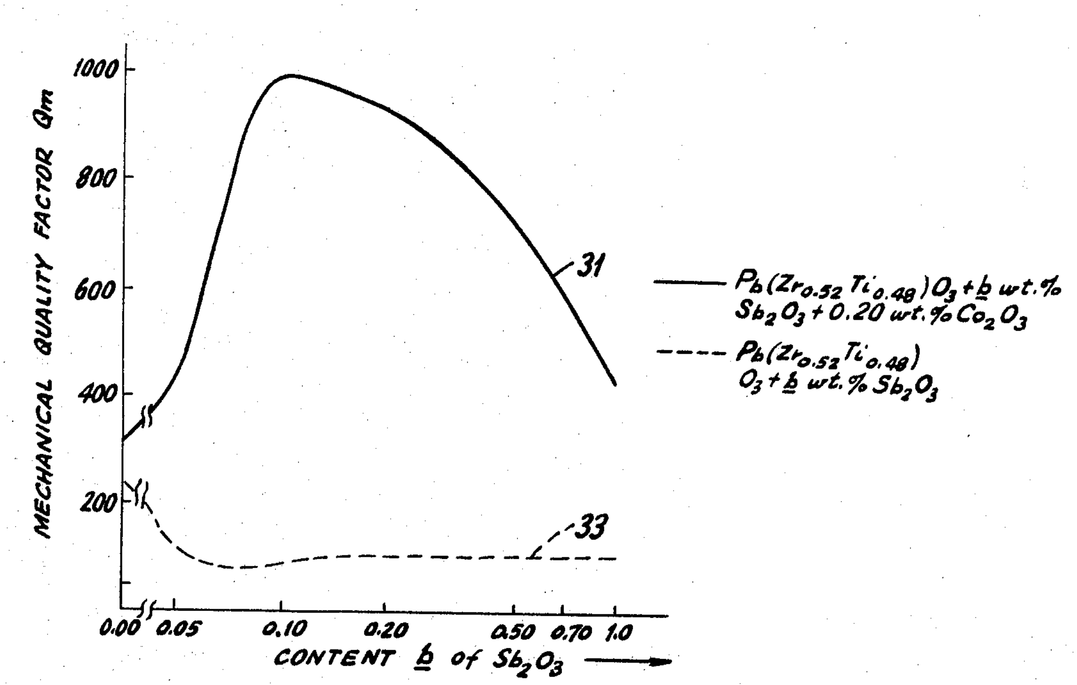
Figure 3A:
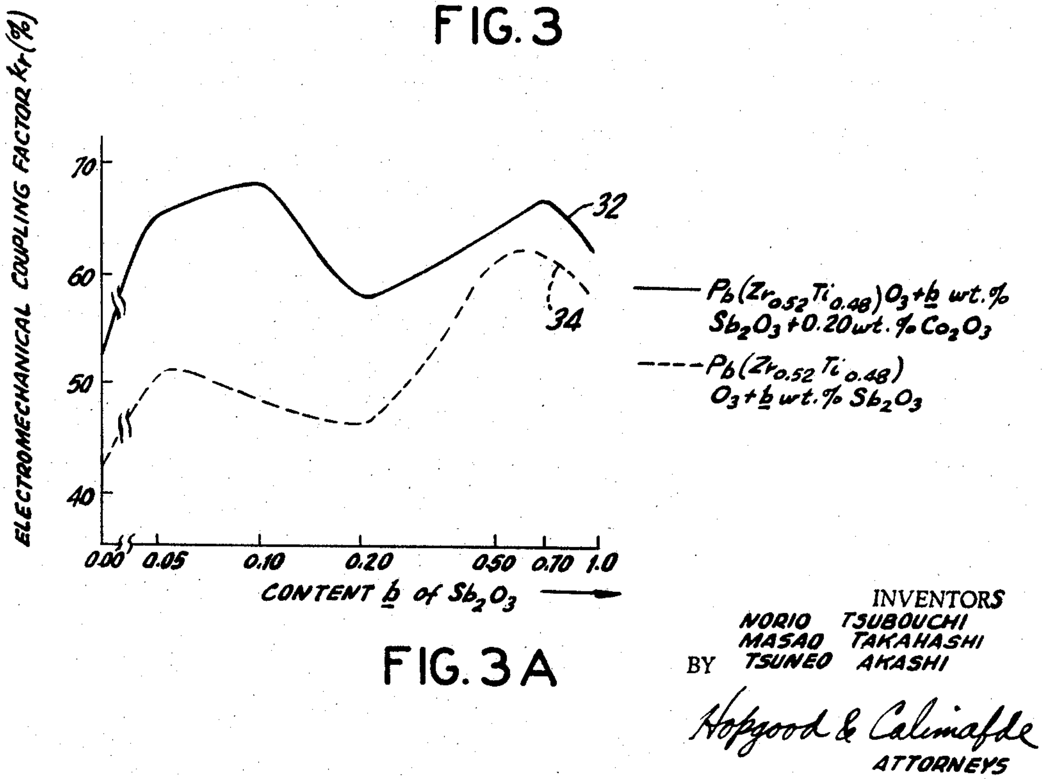
Figures 4, 4A:
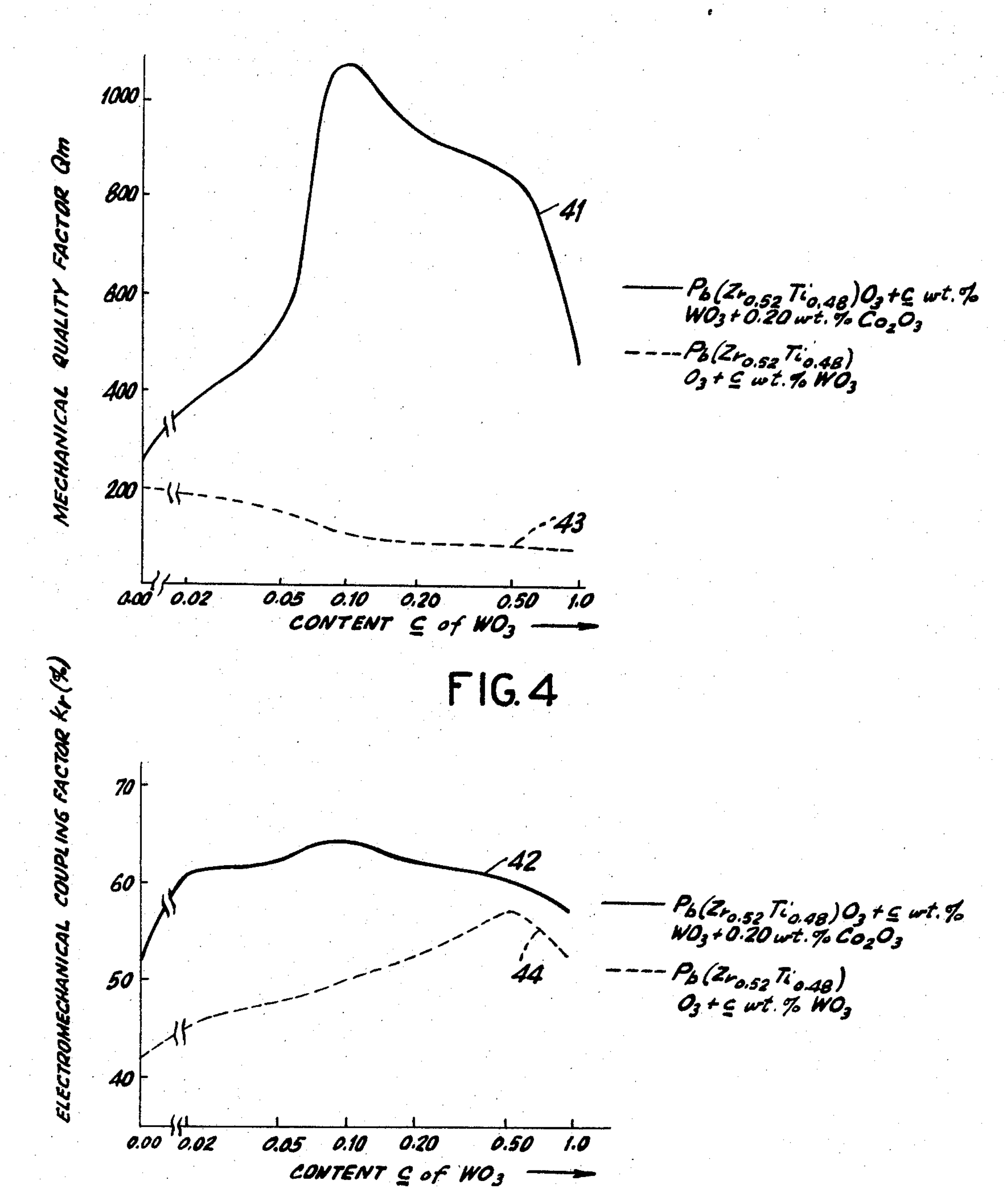

With this basic composition, it is possible to enhance both the electromechanical coupling factor and the mechanical quality factor and to provide piezoelectric ceramics having excellent properties for use in the elements of ceramic filters and the transducer elements of mechanical filters by adding thereto the two additional constituents consisting of cobalt sesquioxide ($Co_2O_3$) of from 0.03 weight percent to 0.70 weight percent and either antimony sesquioxide ($Sb_2O_3$) of from 0.05 weight percent to 1.0 weight percent or tungsten trioxide ($WO_3$) of from 0.02 weight percent to 1.0 weight percent. The improved properties are not realized where only one of cobalt oxide, antimony oxide and tungsten oxide is added to the same basic composition, as compared to the piezoelectric ceramic composition of the invention made by adding (1) both antimony oxide and cobalt oxide or (2) both tungsten oxide and cobalt oxide as additional constituents to $Pb(ZrTiSn)O_3$ The foregoing and other objects, features and advantages of the invention will be apparent from the following more particular description of the preferred examples of the invention, when taken in conjunction with the accompanying drawings, in which:

FIGS. 1 and 1A are graphs depicting the piezoelectric properties (mechanical quality factor and electromechanical coupling factor) of piezoelectric ceramics made of the basic composition containing antimony sesquioxide and cobalt sesquioxide according to this invention as compared to conventional piezoelectric ceramics consisting of the basic composition containing cobalt sesquioxide alone, as a function of the content of cobalt sesquioxide;

FIGS. 2 and 2A are graphs showing piezoelectric properties of piezoelectric ceramics made of the basic composition containing tungsten trioxide and cobalt sesquioxide as compared to conventional piezoelectric ceramics consisting of the basic composition containing cobalt sesquioxide alone, as a function of the content of cobalt sesquioxide;

FIGS. 3 and 3A are illustrative of graphs showing the piezoelectric properties of ceramics made of the basic composition containing $Sb_2O_3$ and $Co_2O_3$ as compared to conventional ceramic consisting of the basic composition containing $Sb_2O_3$ alone, as a function of the content of $Sb_2O_3$; and FIGS. 4 and 4A show graphs illustrating piezoelectric properties of ceramics made of the basic composition with $WO_3$ and $Co_2O_3$ as compared to the basic composition containing $WO_3$, as a function of the content of $WO_3$.

EXAMPLE 1

In producing a basic composition represented by the formula $Pb(Zr_{0.52}Ti_{0.48})O_3$, powder comprising about 50 mol percent of lead monoxide (PbO), 26 mol percent of zirconium dioxide ($ZrO_2$) and 24 mol percent of titanium dioxide ($TiO_2$) is provided to which is added about 0.10 weight percent of antimony sesquioxide ($Sb_2O_3$) and from about 0.03 weight percent to 0.70 weight percent cobalt sesquioxide ($Co_2O_2$) and the ingredients mixed in a ball mill. Similarly, the powder comprising 50 mol percent PbO, 26 mol percent $ZrO_2$, 24 mol percent $TiO_2$ is provided to which is added about 0.10 weight percent of tungsten trioxide ($WO_3$) and about 0.03 weight percent to 0.70 weight percent tungsten trioxide ($WO_3$), the ingredients being mixed in a ball mill. Mixed powder of each of the foregoing is pre-sintered at about 900° C. for about one hour, crushed, press-molded into discs, and sintered at 1300° C. for one hour. The resulting ceramic discs are provided with silver electrodes and piezoelectrically activated at 100° C. for one hour under a supplied electric field of 50 kv./cm. After the discs have been allowed to stand for 24 hours, the electromechanical coupling factor for the radial mode vibration (hereafter referred to as $k_r$) and the mechanical quality factor (hereafter referred to as $Q_m$) are measured to evaluate the piezoelectric activities. Typical results obtained are shown in Table 1.

TABLE 1

| No. | Composition | $k_r$ (Percent) | $Q_m$ |
|---|---|---|---|
| 1 | $Pb(Zr_{0.52}Ti_{0.48})O_3$ | 42 | 250 |
| 2 | $Pb(Zr_{0.52}Ti_{0.48})O_3$+0.10 wt. percent $Sb_2O_3$ | 48 | 95 |
| 3 | $Pb(Zr_{0.52}Ti_{0.48})O_3$+0.10 wt. percent $Sb_2O_3$+0.03 wt. percent $Co_2O_3$ | 63 | 420 |
| 4 | $Pb(Zr_{0.52}Ti_{0.48})O_3$+0.10 wt. percent $Sb_2O_3$+0.05 wt. percent $Co_2O_3$ | 72 | 680 |
| 5 | $Pb(Zr_{0.52}Ti_{0.48})O_3$+0.10 wt. percent $Sb_2O_3$+0.10 wt. percent $Co_2O_3$ | 71 | 920 |
| 6 | $Pb(Zr_{0.52}Ti_{0.48})O_3$+0.10 wt. percent $Sb_2O_3$+0.20 wt. percent $Co_2O_3$ | 68 | 1,000 |
| 7 | $Pb(Zr_{0.52}Ti_{0.48})O_3$+0.10 wt. percent $Sb_2O_3$+0.50 wt. percent * $Co_2O_3$ | 63 | 520 |
| 8 | $Pb(Zr_{0.52}Ti_{0.48})O_3$+0.10 wt. percent $Sb_2O_3$+0.70 wt. percent $Co_2O_3$ | 60 | 420 |
| 9 | $Pb(Zr_{0.52}Ti_{0.48})O_3$+0.10 wt. percent $WO_3$ | 50 | 110 |
| 10 | $Pb(Zr_{0.52}Ti_{0.48})O_3$+0.10 wt. percent $WO_3$+0.03 wt. percent $Co_2O_3$ | 64 | 390 |
| 11 | $Pb(Zr_{0.52}Ti_{0.48})O_3$+0.10 wt. percent $WO_3$+0.05 wt. percent $Co_2O_3$ | 70 | 640 |
| 12 | $Pb(Zr_{0.52}Ti_{0.48})O_3$+0.10 wt. percent $WO_3$+0.10 wt. percent $Co_2O_3$ | 65 | 640 |
| 13 | $Pb(Zr_{0.52}Ti_{0.48})O_3$+0.10 wt. percent $WO_3$+0.20 wt. percent $Co_2O_3$ | 64 | 1,080 |
| 14 | $Pb(Zr_{0.52}Ti_{0.48})O_3$+0.10 wt. percent $WO_3$+0.50 wt. percent * $Co_2O_3$ | 60 | 770 |
| 15 | $Pb(Zr_{0.52}Ti_{0.48})O_3$+0.10 wt. percent $WO_3$+0.70 wt. percent $Co_2O_3$ | 58 | 580 |

* Cobalt carbonate ($CoCO_3$) is added as calculated on the basis of $Co_2O_3$.

Comparisons between the results Nos. 1 and 2 and between the results Nos. 1 and 9 of Table 1 show that addition of 0.10 weight percent of $Sb_2O_3$ alone, or $WO_3$ alone, to the basic composition raises considerably the value of $k_r$ but results in the marked decrease in the $Q_m$ value. Increase in $k_r$ to a higher extent than that to be achieved by presence of $Sb_2O_3$ or $WO_3$ alone and concurrent remarkable increase in $Q_m$ which will be lowered if $Sb_2O_3$ or $WO_3$ alone is present, would, therefore, provide piezoelectric materials having wider field of application and hence more improved piezoelectric materials. Comparison of the results Nos. 1 and 2 of Table 1 with the results Nos. 3 through 8 proves that addition of both $Sb_2O_3$ and from 0.03 weight percent to 0.70 weight percent of $Co_2O_3$ to the basic composition markedly raises both $k_r$ and $Q_m$. Also, it will be apparent, if the results Nos. 1 and 9 are compared with the results Nos. 10 through 15, that coexistence of both $WO_3$ and 0.03 wt. percent–0.70 wt. percent $Co_2O_3$ in the basic composition results in remarkable increase in both $k_r$ and $Q_m$.

In general, increase in one of $k_r$ and $Q_m$ results in decrease in the other. However, addition of both $Sb_2O_3$ and $Co_2O_3$ or both $WO_3$ and $Co_2O_3$ to the basic composition makes it possible to markedly enchance synergistically both $k_r$ and $Q_m$ to meet the different requirement of providing piezoelectric materials having simultaneously raised $k_r$ and $Q_m$. This means provision of excellent materials for use as the piezoelectric material in the ceramic filters where specifically large $k_r$ is required and in the transducers of mechanical filters.

Referring to FIGS. 1 and 1A, solid curves 11 and 12 show $Q_m$ and $k_r$, respectively, as a function of the content of $Co_2O_3$ when 0.10 weight percent of $Sb_2O_3$ and a varying amount of $Co_2O_3$ are simultaneously added to $$Pb(Zr_{0.52}Ti_{0.48})O_3$$

Dotted curves 13 and 14 show the relations of $Q_m$ and $k_r$ to the content of $Co_2O_3$, respectively, in case a varying amount of $Co_2O_3$ alone is added to the same basic composition. From FIGS. 1 and 1A, it will be quite clear that excellent piezoelectric materials are produced in case the content of $Co_2O_3$ falls between 0.03 weight percent to 0.70 weight percent.

Referring to FIGS. 2 and 2A, the relations of $Q_m$ and $k_r$ to the content of $Co_2O_3$ are plotted with solid curves 21 and 22, respectively, for results obtained by addition of both 0.10 wt. percent $WO_3$ and $Co_2O_3$ in a varying amount, while dotted curves 23 and 24 are the same as the dotted curves 13 and 14 of FIGS. 1 and 1A. FIGS. 2 and 2A quite clearly show that excellent piezoelectric materials are produced in case $Co_2O_3$ exists in the basic composition within the range from 0.03 weight percent to 0.70 weight percent together with $Sb_2O_3$.

In case the content of $Co_2O_3$ is less than 0.03 weight percent, coexistence of $Sb_2O_3$ and $Co_2O_3$ serves little to improve the piezoelectric activities achieved by the presence of $Sb_2O_3$ alone. The same effect is recognized in case of co-presence of $WO_3$ and $Co_2O_3$. Where the content of $Co_2O_3$ exceeds 0.70 weight percent, an improvement is not obtained in the activities which would otherwise be attained through the co-presence of $Sb_2O_3$ and $Co_2O_3$ (or $WO_3$ and $Co_2O_3$). More particularly, where the content of $Co_2O_3$ is more than 0.70 weight percent, the properties fall off regardless of the co-presence of $Sb_2O$ (or $WO_3$) with $Co_2O_3$.

In view of the above, a range between 0.03 weight percent and 0.70 weight percent is selected for the effective range of the $Co_2O_3$ content.

Additional examples are given utilizing similar treatments as in the foregoing, except where indicated to the contrary.

EXAMPLE 2

Table 2 shows the results obtained for a mixture (No. 16) of the basic composition of the same constituents as in Example 1 with 0.20 weight percent of cobalt sesquioxide ($Co_2O_3$) alone, for mixtures (Nos. 17–21) with further addition of antimony sesquioxide ($Sb_2O_3$) of from 0.05 weight percent to 1.0 weight percent, and for mixtures (Nos. 22–26) with addition of tungsten trioxide ($WO_3$) of from 0.02 weight percent to the No. 16 mixture.

excellent piezoelectric materials are produced in case $Sb_2O_3$ of from 0.05 wt. percent to 1.0 wt. percent exists in the basic composition together with $Co_2O_3$.

If the content of $Sb_2O_3$ is less than 0.05 weight percent, co-presence of $Sb_2O_3$ and $Co_2O_3$ results in little improvement of the piezoelectric activities obtained by presence of $Co_2O_3$ alone. On the other hand, the piezoelectric properties are so changed regardless of the presence of $Co_2O_3$ with $Sb_2O_3$ that the co-presence of $Co_2O_3$ hardly appreciably improves the properties, if the content of $Sb_2O_3$ exceeds 1.0 weight percent. Consequently, the effective range of the $Sb_2O_3$ content should be limited from about 0.05 weight percent to 1.0 weight percent.

Referring to FIGS. 4 and 4A the relations of $Q_m$ and $k_r$ to the content of $WO_3$ are plotted with solid curves 41 and 42, respectively, on the basis of the results obtained by addition of both $WO_3$ of a varying amount and 0.20 wt. percent $Co_2O_3$ to $Pb(Zr_{0.52}Ti_{0.48})O_3$, while similar relations are shown by dotted curves 43 and 44 on the basis of the results of addition of $WO_3$ alone of a varying amount to the same basic composition. FIGS. 2 and 2A clearly show that in case $WO_3$ of from 0.02 wt. percent to 1.0 wt. percent exists in the basic composition together with $Co_2O_3$, excellent piezoelectric materials are obtainable.

Where the content of $WO_3$ is less than 0.02 weight percent, the co-presence of $WO_3$ and $Co_2O_3$ contributes little to the improvement of the piezoelectric activities attained by presence of $Co_2O_3$ alone and responds little to the expectation of improving the activities by concurrent addition of $WO_3$ and $Co_2O_3$. Where the content of $WO_3$ exceeds 1.0 weight percent, there is a marked falling off in properties regardless of the presence of $Co_2O_3$ with $WO_3$. In view of the above, a range between about 0.02 weight percent and 1.0 weight percent should be selected for the effective range of the $WO_3$ content.

It should be noted here that the improvements made in the piezoelectric properties by addition of both $Sb_2O_3$

TABLE 2

| No. | Composition | $k_r$ (Percent) | $Q_m$ |
|---|---|---|---|
| 16 | $Pb(Zr_{0.52}Ti_{0.48})O_3$+0.20 wt. percent $Co_2O_3$ | 52 | 320 |
| 17 | $Pb(Zr_{0.52}Ti_{0.48})O_3$+0.05 wt. percent $Sb_2O_3+Co_2O_3$ | 65 | 440 |
| 18 | $Pb(Zr_{0.52}Ti_{0.48})O_3$+0.20 wt. percent $Sb_2O_3+Co_2O_3$ | 58 | 940 |
| 19 | $Pb(Zr_{0.52}Ti_{0.48})O_3$+0.50 wt. percent $Sb_2O_3+Co_2O_3$ | 64 | 740 |
| 20 | $Pb(Zr_{0.52}Ti_{0.48})O_3$+0.70 wt. percent $Sb_2O_3+Co_2O_3$* | 67 | 560 |
| 21 | $Pb(Zr_{0.52}Ti_{0.48})O_3$+1.0 wt. percent $Sb_2O_3+Co_2O_3$ | 62 | 390 |
| 22 | $Pb(Zr_{0.52}Ti_{0.48})O_3$+0.02 wt. percent $WO_3+Co_2O_3$ | 61 | 380 |
| 23 | $Pb(Zr_{0.52}Ti_{0.48})O_3$+0.05 wt. percent $WO_3+Co_2O_3$ | 62 | 540 |
| 24 | $Pb(Zr_{0.52}Ti_{0.48})O_3$+0.20 wt. percent $WO_3+Co_2O_3$ | 62 | 940 |
| 25 | $Pb(Zr_{0.52}Ti_{0.48})O_3$+0.50 wt. percent $WO_3+Co_2O_3$ | 60 | 850 |
| 26 | $Pb(Zr_{0.52}Ti_{0.48})O_3$+1.0 wt. percent $WO_3+Co_2O_3$ | 57 | 480 |

*$Sb_4O_5Cl_2$ is added as calculated on the basis of $Sb_2O_3$.

Comparison of the result No. 1 of Table 1 with the result No. 16 of Table 2 shows that addition of 0.20 weight percent of $Co_2O_3$ alone to the basic composition provides a piezoelectric material having fairly enhanced $k_r$ and $Q_m$. It should, however, be understood that further increase in $k_r$ and $Q_m$ to a large extent, which already are enchanced by addition of $Co_2O_3$ to the basic composition, would provide piezoelectric materials having wider field of application and hence still further improved piezoelectric materials. Such further increase is accomplished either by addition of both $Sb_2O_3$ and $Co_2O_3$ as shown by the results Nos. 17–21 of Table 2 or by addition of both $WO_3$ and $Co_2O_3$ as is seen from the results Nos. 22–26.

Referring to FIGS. 3 and 3A, solid curves 31 and 32 show $Q_m$ and $k_r$, respectively, versus the content of $Sb_2O_3$ when a varying amount of $Sb_2O_3$ and 0.20 wt. percent of $Co_2O_3$ are concurrently added to $Pb(Zr_{0.52}Ti_{0.48})O_3$. Dotted curves 33 and 34 in turn show the relations of $Q_m$ and $k_r$ to the content of $Sb_2O_3$, respectively, in case a varying amount of $Sb_2O_3$ alone is added to the same basic composition. It will be clear from FIGS. 3 and 3A that and $Co_2O_3$ or both $WO_3$ and $Co_2O_3$ clearly result from the co-presence of antimony and cobalt ions or tungsten and cobalt ions. It is possible in various ways to introduce cobalt ions, antimony ions or tungsten ions into the composition. As is generally adopted on introducing the effective element into principal composition, use may be made, as exemplified in Tables 1 and 2, of the oxide per se or compounds of cobalt, antimony or tungsten which decompose into the respective oxide at elevated temperatures. It is thus possible on introducing cobalt ions by using cobalt carbonate or the like in place of cobalt sesquioxide ($Co_2O_3$). On introducing antimony or tungsten ions into the composition, it is possible to utilize a powder of algaroth ($Sb_4O_5Cl_2$) or the like instead of antimony sesquioxide ($Sb_2O_3$) or to employ tungsten sulfide ($WS_3$) or the like instead of tungsten trioxide ($WO_3$). In case compounds of cobalt, antimony or tungsten other than $Co_2O_3$, $Sb_2O_3$ or $WO_3$ are utilized, they should be used in their respective amounts equivalent to the desired weight of $Co_2O_3$, $Sb_2O_3$ or $WO_3$. Use of such compounds is exemplified by the compositions No. 7 in Table 1 and No. 20 in Table 2. In this connection, it should be understood that cobalt sesquioxide ($Co_2O_3$), antimony sesquioxide ($Sb_2O_3$) or tungsten trioxide ($WO_3$) as used hereafter may also mean such compounds of cobalt, antimony or tungsten which may be thermally decomposed into cobalt sesquioxide ($Co_2O_3$), antimony sesquioxide ($Sb_2O_3$) or tungsten trioxide ($WO_3$), respectively.

EXAMPLE 3

Piezoelectric properties $k_r$ and $Q_m$ are shown in Table 3 for typical ceramics (Nos. 27, 30, and 33) consisting only of the basic composition $Pb(Zr_xTi_ySn_z)O_3$ where $x$ and $y$ are selected between 0.50 and 0.55 and between 0.50 and 0.45, respectively, while maintaining 0.00 for $z$, for typical ceramics (Nos. 28, 31, and 34) given by adding both 0.10 weight percent of $Sb_2O_3$ and 0.20 weight percent of $Co_2O_3$ to the above basic compositions, and for those (Nos. 29, 32, and 35) given by adding both 0.10 wt. percent $WO_3$ and 0.20 wt. percent $Co_2O_3$ to the same basic compositions.

TABLE 3

| No. | Composition | $k_r$ (Percent) | $Q_m$ |
|---|---|---|---|
| 27 | $Pb(Zr_{0.50}Ti_{0.50})O_3$ | 29 | 340 |
| 28 | $Pb(Zr_{0.50}Ti_{0.50})O_3$+0.10 wt. percent $Sb_2O_3$+0.20 wt. percent $Co_2O_3$ | 59 | 1,210 |
| 29 | $Pb(Zr_{0.50}Ti_{0.50})O_3$+0.10 wt. percent $WO_3$+0.20 wt. percent $Co_2O_3$ | 54 | 1,160 |
| 30 | $Pb(Zr_{0.53}Ti_{0.47})O_3$ | 41 | 300 |
| 31 | $Pb(Zr_{0.53}Ti_{0.47})O_3$+0.10 wt. percent $Sb_2O_3$+0.20 wt. percent $Co_2O_3$ | 67 | 980 |
| 32 | $Pb(Zr_{0.53}Ti_{0.47})O_3$+0.10 wt. percent $WO_3$+0.20 wt. percent $Co_2O_3$ | 62 | 1,050 |
| 33 | $Pb(Zr_{0.55}Ti_{0.45})O_3$ | 39 | 320 |
| 34 | $Pb(Zr_{0.55}Ti_{0.45})O_3$+0.10 wt. percent $Sb_2O_3$+0.20 wt. percent $Co_2O_3$ | 63 | 1,160 |
| 35 | $Pb(Zr_{0.55}Ti_{0.45})O_3$+0.10 wt. percent $WO_3$+0.20 wt. percent $Co_2O_3$ | 58 | 1,130 |

Table 3 clearly shows that change of $x$ and $y$ in the ceramic materials whose basic composition is given by $Pb(Zr_xTi_ySn_z)O_3$ does not damage the piezoelectric properties improved either by co-presence of $Sb_2O_3$ and $Co_2O_3$ or by co-presence of $WO_3$ and $Co_2O_3$.

EXAMPLE 4

Table 4 shows the piezoelectric properties of the ceramics (Nos. 36 and 39) given by the basic compositions $Pb(Zr_xTi_ySn_z)O$ where $x$=0.47, $y$=0.48, and $z$=0.05 and where $x$=0.42, $y$=0.48, and $z$=0.10, those (Nos. 37 and 40) obtained by adding thereto 0.10 weight percent of $Sb_2O_3$ and 0.2 weight percent of $Co_2O_3$, and those (Nos. 38 and 41) given by adding 0.10 wt. percent $WO_3$ and 0.20 wt. percent $Co_2O_3$ to the above basic compositions.

TABLE 4

| No. | Composition | $k_r$ (Percent) | $Q_m$ |
|---|---|---|---|
| 36 | $Pb(Zr_{0.47}Ti_{0.48}Sn_{0.05})O_3$ | 40 | 280 |
| 37 | $Pb(Zr_{0.47}Ti_{0.48}Sn_{0.05})O_3$+0.10 wt. percent $Sb_2O_3$+0.20 wt. percent $Co_2O_3$ | | |
| 38 | $Pb(Zr_{0.47}Ti_{0.48}Sn_{0.05})O_3$+0.10 wt. percent $WO_3$+0.20 wt. percent $Co_2O_3$ | 62 | 1,030 |
| 39 | $Pb(Zr_{0.42}Ti_{0.48}Sn_{0.10})O_3$ | 41 | 300 |
| 40 | $Pb(Zr_{0.42}Ti_{0.48}Sn_{0.10})O_3$+0.10 wt. percent $Sb_2O_3$+0.20 wt. percent $Co_2O_3$ | 61 | 1,020 |
| 41 | $Pb(Zr_{0.42}Ti_{0.48}Sn_{0.10})O_3$+0.10 wt. percent $WO_3$+0.20 wt. percent $Co_2O_3$ | 61 | 1,060 |

Comparison of the results Nos. 6 and 13 of Table 1 with Table 4 clearly shows that substitution of tin (Sn) for a portion of the basic composition does not harm the piezoelectric properties improved by co-presence of $Sb_2O_3$ and $Co_2O_3$ or $WO_3$ and $Co_2O_3$ without the tin substitution.

EXAMPLE 5

Table 5 shows the results obtained by substituting each of barium (Ba), strontium (Sr), and calcium (Ca) for 5 atom percent of the lead (Pb) in the compositions Nos. 40 and 41 of Table 4.

TABLE 5

| No. | Composition | $k_r$ (Percent) | $Q_m$ |
|---|---|---|---|
| 42 | $(Pb_{0.95}Ba_{0.05})(Zr_{0.42}Ti_{0.48}Sn_{0.10})O_3$+0.10 wt. percent $Sb_2O_3$+0.20 wt. percent $Co_2O_3$ | 65 | 1,030 |
| 43 | $(Pb_{0.95}Ba_{0.05})(Zr_{0.42}Ti_{0.48}Sn_{0.10})O_3$+0.10 wt. percent $WO_3$+0.20 wt. percent $Co_2O_3$ | 63 | 1,090 |
| 44 | $(Pb_{0.95}Sr_{0.05})(Zr_{0.42}Ti_{0.48}Sn_{0.10})O_3$+0.10 wt. percent $Sb_2O_3$+0.20 wt. percent $Co_2O_3$ | 67 | 990 |
| 45 | $(Pb_{0.95}Sr_{0.05})(Zr_{0.42}Ti_{0.48}Sn_{0.10})O_3$+0.10 wt. percent $WO_3$+0.20 wt. percent $Co_2O_3$ | 62 | 1,060 |
| 46 | $(Pb_{0.95}Ca_{0.05})(Zr_{0.42}Ti_{0.48}Sn_{0.10})O_3$+0.10 wt. percent $Sb_2O_3$+0.20 wt. percent $Co_2O_3$ | 59 | 970 |
| 47 | $(Pb_{0.95}Ca_{0.05})(Zr_{0.42}Ti_{0.48}Sn_{0.10})O_3$+0.10 wt. percent $WO_3$+0.20 wt. percent $Co_2O_3$ | 59 | 1,040 |

Table 5 clearly shows that piezoelectric properties are equally well improved either by co-presence of $Sb_2O_3$ and $Co_2O_3$ or by co-presence of $WO_3$ and $Co_2O_3$ for both cases where at least one member of barium, strontium, and calcium is substituted for a portion of the lead in the basic composition and where no such substitution is made.

Examples 4 and 5 show that it is possible to provide an excellent piezoelectric material, by addition of both $Co_2O_3$ and $Sb_2O_3$ or $WO_3$, with the basic compositions consisting not only of lead titanate-lead zirconate solid solution but also of lead titanate-lead zirconate-lead stannate solid solution and, still further, with compositions in which a portion of the lead in these solid solutions is substituted for by at least one alkaline earth metal.

It will be apparent from the foregoing description that the excellent piezoelectric materials improved as above are not obtainable by addition of a sole member of $Co_2O_3$, $Sb_2O_3$, and $WO_3$ but are realized by the co-presence of $Co_2O_3$ with either $Sb_2O_3$ or $WO_3$.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A piezoelectric ceramic composition comprised of a basic composition given by the compositional formula $Pb_uM_v(Zr_xTi_ySn_z)O_3$, where $x$, $y$, and $z$ represent a set of mol ratios as follows:

$x$=up to about 0.90, $y$=about 0.10 to 0.60, $z$=up to about 0.65,
and $x+y+z=1.00$, where M represents at least one member selected from the group consisting of Ba, Sr and Ca, and where $u$ and $v$ indicate a set of atom ratios as follows:

$u$=about 0.75 to 1.00,
$v$=up to about 0.25,
and $u+v=1.00$, said ceramic composition also containing cobalt sesquioxide ($Co_2O_3$) in an amount ranging from about 0.03 to 0.70 weight percent, and one member selected from the group consisting of antimony sesquioxide ($Sb_2O_3$) in an amount ranging from about 0.05 to 1.0 weight percent and tungsten trioxide ($WO_3$) in an amount ranging from about 0.02 to 1.0 weight percent.

2. The ceramic composition of claim 1, wherein the composition formula is $Pb(Zr_xTi_ySn_z)O_3$.

3. The ceramic composition of claim 1, wherein $x$ is about 0.52 to 0.53 and $y$ is about 0.48 to 0.47.

4. In a method for improving the electromechanical coupling and the mechanical quality factors of a piezoelectric ceramic composition based on the compositional formula $Pb_uM_v(Zr_xTi_ySn_z)O$, where $x$, $y$, and $z$ represent a set of mol ratios as follows:

$x$=up to about 0.90,
$y$=about 0.10 to 0.60,
$z$=up to about 0.65,
and $x+y+z=1.00$, where M represents at least one member selected from the group consisting of Ba, Sr and Ca. and where $u$ and $v$ indicate a set of atom ratios as follows:

$u$=about 0.75 to 1.00,
$v$=up to about 0.25,
and $u+v=1.00$, the improvement which consists essentially of incorporating in said composition about 0.03 to 0.70 weight percent cobalt sesquioxide and one member selected from the group consisting of about 0.05 to 1.0 percent by weight of antimony sesquioxide and about 0.02 to 1.0 percent by weight of tungsten trioxide.

5. The method of claim 4, wherein $x$ and $y$ in the formula are about 0.52 to 0.53 and about 0.48 to 0.47, respectively.

References Cited

UNITED STATES PATENTS

| | | | |
|---|---|---|---|
| 3,068,177 | 12/1962 | Sugden | 252—62.9 |
| 3,170,094 | 1/1964 | Roup et al. | 252—62.9 |
| 3,372,121 | 3/1968 | Banno | 252—62.9 |

TOBIAS E. LEVOW, Primary Examiner

J. COOPER, Assistant Examiner

U.S. Cl. X.R.

106—39